United States Patent
Kim et al.

(10) Patent No.: US 7,889,278 B2
(45) Date of Patent: Feb. 15, 2011

(54) DISPLAY APPARATUS THAT DISPLAYS IMAGE AND SUB IMAGE AND CONTROL METHOD THEREOF

(75) Inventors: Jung-dae Kim, Seoul (KR); Jae-seung Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1261 days.

(21) Appl. No.: 11/478,671

(22) Filed: Jul. 3, 2006

(65) Prior Publication Data

US 2007/0008430 A1   Jan. 11, 2007

(30) Foreign Application Priority Data

Jul. 11, 2005   (KR) .................. 10-2005-0062316

(51) Int. Cl.
H04N 5/45  (2006.01)
(52) U.S. Cl. ..................................................... 348/565
(58) Field of Classification Search ......... 348/563–565, 348/569, 568, 584, 588, 586; 345/629, 635, 345/634; 725/43, 59; H04N 5/445, 5/45, H04N 9/74, 9/76, 5/50
See application file for complete search history.

(56) References Cited

U.S. PATENT DOCUMENTS 6,256,027 B1   7/2001   Jeong et al.
6,590,618 B1*  7/2003   Park et al. ............... 348/565
2004/0075770 A1*  4/2004   Lee ........................... 348/565
2006/0221237 A1* 10/2006   Min et al. ................. 348/565
2007/0139402 A1*  6/2007   Chang ...................... 348/565

FOREIGN PATENT DOCUMENTS

| CN | 1218350 A | 6/1999 |
| CN | 1538743 A | 10/2004 |
| EP | 1445945 A2 | 8/2007 |
| JP | 2003-309780 A | 10/2003 |
| KR | 1998-023190 A | 7/1998 |
| KR | 1999-0051197 A | 7/1999 |
| KR | 2002-0022368 A | 3/2002 |
| KR | 10-2003-0078916 A | 10/2003 |
| KR | 2005-0059353 A | 6/2005 |

* cited by examiner

Primary Examiner—Sherrie Hsia
(74) Attorney, Agent, or Firm—Sughrue Mion, PLLC (57) ABSTRACT

The present invention relates to a display apparatus comprising a display part which displays a main image and a sub image thereon, further comprising a user selection part having a menu adjusting button, such as a button; and a processor to adjust a display state of the sub image by a selection of the menu adjusting button if the display part displays the main image and the sub image thereon, and to adjust a predetermined menu by the selection of the menu adjusting button if the display part does not display the sub image thereon. Thus, the present invention provides a display apparatus to change a display state of a sub image without difficulty and a control method thereof.

32 Claims, 5 Drawing Sheets

DISPLAY APPARATUS THAT DISPLAYS IMAGE AND SUB IMAGE AND CONTROL METHOD THEREOF

CROSS-REFERENCE TO RELATED APPLICATIONS

This application claims the benefit of Korean Patent Application No. 2005-0062316, filed on Jul. 11, 2005, in the Korean Intellectual Property Office, the disclosure of which is incorporated herein by reference.

BACKGROUND OF THE INVENTION

1. Field of the Invention

Apparatuses and methods consistent with the present invention relate to a display apparatus and a control method thereof, and more particularly, to a display apparatus to display a main image and a sub image on a display part, and a control method thereof.

2. Description of the Related Art

Recently, a display apparatus, which supports a picture in picture (PIP) function and a picture out picture (POP) function, has been widely used. The PIP and POP functions allow a display part to display two images, i.e., a main image and a sub image thereon simultaneously. The PIP function is to process image signals input from at least two image sources to display the main image on the display part and to display the sub image within the main image. The POP function is to display the main image and to display the sub image on an outside of the main image.

Hereinafter, a function of displaying the main and sub images on the display part simultaneously will be referred to as the PIP function, regardless of positions of the main and sub images.

In a related art display apparatus which supports the PIP function, a display state of the sub image, i.e., the position and size thereof is adjusted in a separate menu. Also, the related art display apparatus provides respective menus to adjust the position of the main image, and to change the position of the sub image displayed within the main image into an outside thereof or to change it vice versa. Thus, in the related art display apparatus, a user may enter the respective menus to adjust the positions of the main image and the sub image.

SUMMARY OF THE INVENTION

Accordingly, it is one aspect of the present invention to provide a display apparatus operable to change a display state of a sub image without difficulty, and a control method thereof.

Additional aspects and/or advantages of the present invention will be set forth in part in the description which follows and, in part, will be obvious from the description, or may be learned by practice of the present invention.

The foregoing and/or other aspects of the present invention are also achieved by providing a display apparatus comprising a display part which displays a main image and a sub image thereon, further comprising a user selection part having a menu adjusting button; and a processor to adjust a display state of the sub image by a selection of the menu adjusting button if the display part displays the main image and the sub image thereon, and to adjust a predetermined menu by the selection of the menu adjusting button if the display part does not display the sub image thereon.

According to another aspect of the present invention, the display apparatus further comprises an interface generator to generate a menu window having a predetermined menu, wherein the processor adjusts one of the display state of the sub image and the menu according to a preset priority if the menu adjusting button is selected in a case that the main image, the sub image and the menu window are displayed on the display part.

According to yet another aspect of the present invention, the menu adjusting button comprises a direction key to adjust the menu, and the processor adjusts the menu if the menu adjusting button is selected in a case that the main image, the sub image and the menu window are displayed on the display part, and adjusts the display state of the sub image according to an adjustment direction of the direction key if only the main image and the sub image are displayed on the display part.

According to another aspect of the present invention, the processor adjusts the sub image to be displayed in a second side of the main image if the direction key which directs the sub image to the second side of the main image based on the sub image is selected in a case that the sub image is displayed in a first side of the main image.

According to a further aspect of the present invention, the processor adjusts the sub image to be displayed in an external lateral side of the main image if the direction key which directs the sub image to a lateral side of the main image based on the sub image is selected in a case that the sub image is displayed in the lateral side within the main image.

According to another aspect of the present invention, the processor adjusts the sub image to be displayed in the lateral side within the main image if the direction key which directs the sub image to the main image based on the sub image is selected in a case that the sub image is displayed in the external lateral side of the main image.

According to another aspect of the present invention, the processor allows the sub image and the main image to change positions with each other if the direction key which directs an opposite direction of the main image based on the sub image is selected in a case that the sub image is displayed in the external lateral side of the main image.

The foregoing and/or other aspects of the present invention are also achieved by providing a display apparatus comprising a display part to display a main image and a sub image thereon, further comprising a user selection part; and a processor to adjust the sub image to be displayed in an internal lateral side or an external lateral side of the main image by a selection of the user selection part in a case that the sub image is displayed in either the internal lateral side or the external lateral side of the main image.

According to another aspect of the present invention, the user selection part comprises a direction key and the processor adjusts a display state of the sub image according to an adjustment direction of the direction key.

According to another aspect of the present invention, the processor adjusts the sub image to be displayed in the internal lateral side of the main image if the direction key which directs the sub image to the main image based on the sub image is selected in a case that the sub image is displayed in the external lateral side of the main image.

According to another aspect of the present invention, the processor allows the sub image and the main image to change positions with each other if the direction key which directs an opposite direction of the main image based on the sub image is selected in a case that the sub image is displayed in the external lateral side of the main image.

According to another aspect of the present invention, the processor adjusts the sub image to be displayed in a second side of the main image if the direction key which directs the sub image to the second side of the main image based on the sub image is selected in a case that the sub image is displayed in a first side of the main image.

According to another aspect of the present invention, the processor adjusts the sub image to be displayed in the external lateral side of the main image if the direction key which directs the sub image to a lateral side of the main image based on the sub image is selected in a case that the sub image is displayed in the internal lateral side of the main image.

The foregoing and/or other aspects of the present invention are also achieved by providing a method of controlling a display apparatus having a display part to display a main image and a sub image thereon, comprising receiving a selection signal from a predetermined menu adjusting button; adjusting a display state of the sub image by the selection signal if the display part displays the main image and the sub image thereon; and adjusting a predetermined menu by the selection signal if the display part does not display the sub image thereon.

According to another aspect of the present invention, the method further comprises displaying the main image, the sub image and a predetermined menu window on the display part, and adjusting one of the display state of the sub image and the menu according to a predetermined priority if the selection signal is supplied.

According to another aspect of the present invention, the adjusting one of the display state of the sub image and the menu according to the priority comprises adjusting the menu according to the selection signal as the priority is set as the menu.

According to another aspect of the present invention, the adjusting the display state of the sub image comprises receiving the selection signal to direct the sub image to a second side of the main image based on the sub image if the sub image is displayed in a first side of the main image, and adjusting the sub image to be displayed in the second side of the main image.

According to another aspect of the present invention, the adjusting the display state of the sub image comprises receiving the selection signal to direct the sub image to a lateral side of the main image based on the sub image if the sub image is displayed in the lateral side within the main image, and adjusting the sub image to be displayed in the external lateral side of the main image.

According to another aspect of the present invention, the adjusting the display state of the sub image comprises receiving the selection signal to direct the sub image to the main image based on the sub image if the sub image is displayed in the external lateral side of the main image, and adjusting the sub image to be displayed in the lateral side within the main image.

According to another aspect of the present invention, the adjusting the display state of the sub image comprises receiving the selection signal to direct the sub image to an opposite direction of the main image based on the sub image if the sub image is displayed in the external lateral side of the main image, and allowing the main image and the sub image to change positions with each other.

The foregoing and/or other aspects of the present invention are also achieved by providing a method of controlling a display apparatus having a display part to display a main image and a sub image thereon, comprising displaying the sub image in one of an internal lateral side or an external lateral side of the main image, and displaying the sub image in either the internal lateral side or the external lateral side of the main image by a predetermined selection signal.

According to another aspect of the present invention, the method further comprises receiving the selection signal to direct the sub image to the main image based on the sub image if the sub image is displayed in the external lateral side of the main image, and displaying the sub image in the internal lateral side of the main image.

According to another aspect of the present invention, the method further comprises receiving the selection signal to direct the sub image to an opposite direction of the main image based on the sub image if the sub image is displayed in the external lateral side of the main image, and allowing the sub image and the main image to change positions with each other.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to like elements throughout.

Figure 1:
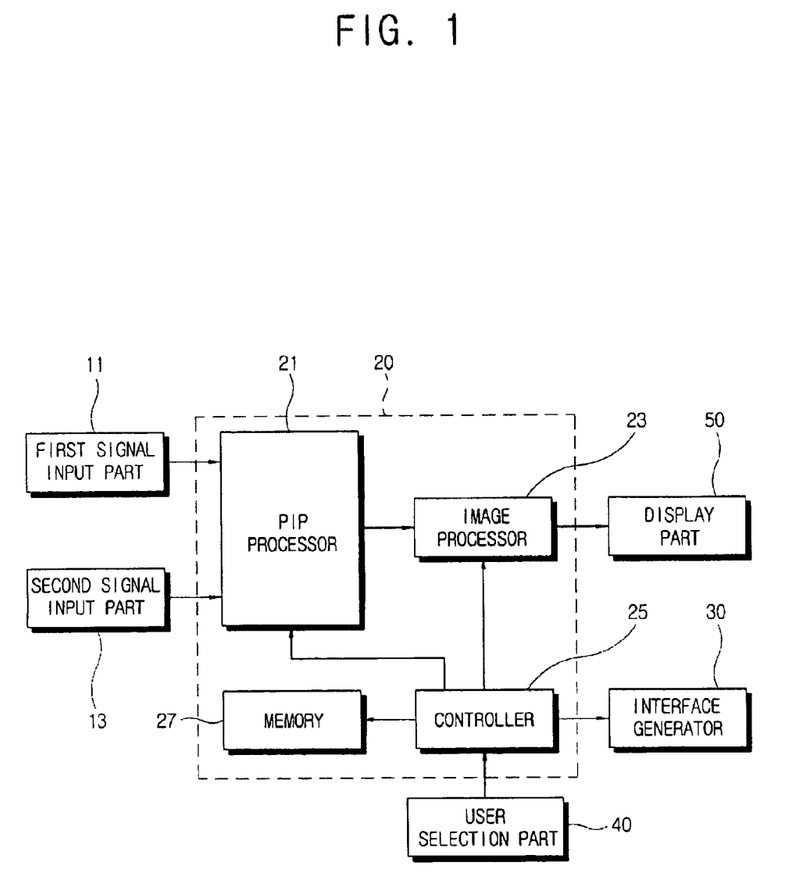
FIG. 1 is a control block diagram of a display apparatus according to an exemplary embodiment of the present invention.

As shown in FIG. 1, a display apparatus according to an exemplary embodiment of the present invention comprises at least two signal input parts 11 and 13; a processor 20 to process an image signal input by the respective signal input parts 11 and 13; a display part 50 to display an image thereon based on the image signal; and a user selection part 40.

The signal input parts 11 and 13 may be plurally provided to receive the image signal from various image signal sources. For example, the signal input parts 11 and 13 may comprise a signal input terminal (not shown) and a signal converter (not shown).

Here, the signal input terminal may comprise a composite input terminal to receive a composite signal; an S-video input terminal to receive an S-video signal; a component input terminal to receive a component signal; a PC input terminal to receive a PC signal; and a TV input terminal to receive a TV signal.

The signal converter converts the image signal in various formats, which is input through the respective signal input terminals. The signal converter may comprise a video decoder (not shown), an A/D converter (not shown) and a tuner (not shown).

An interface generator 30 generates a predetermined menu window to adjust a predetermined menu to be displayed on the display part 50.

The user selection part 40 is provided to input or select a predetermined function by a user. The user selection part 40 may be realized in various ways, e.g., as a plurality of input keys, a button, etc. Here, the user selection part 40 comprises a menu adjusting button to adjust the menu included in the menu window generated by the interface generator 30. The menu adjusting button may comprise direction keys such as left, right, up and down keys to select and adjust the menu.

The user selection part 40 may also comprise a remote controller. The remote controller may include several exemplary embodiments such as a wireless remote controller, a keyboard, a joystick and/or a mouse. If the mouse and keyboard are used as the user selection part 40, they may be connected directly to the display part or the computer. When the mouse and keyboard are connected to the computer, they may transmit the selection signal from the computer through bi-directional communication interface such as DDC communication.

The processor 20 may comprise a PIP processor 21; an image processor 23 to process the image signal processed by the PIP processor 21; a memory 27; and a controller 25 to control the foregoing elements.

The PIP processor 21 processes the image signal input by the respective signal input parts 11 and 13. Specifically, the PIP processor 21 processes the image signal input through the respective signal input parts 11 and 13 as the main image and the sub image according to a control of the controller 25, thereby composing the images of the image signals input by the respective signal input parts 11 and 13 to be displayed on the display part 50 simultaneously.

If the PIP mode does not operate, i.e., if the display part 50 does not display the sub image thereon, the image processor 23 processes only the image signal supplied through one of the plurality of signal input parts 11 and 13 according to the control of the controller 25 to display it on the display part 50.

The controller 25 changes the display state, e.g., size and position of the sub image, if the menu adjusting button of the user selection part 40 is selected in the PIP mode displaying the main image and the sub image on the display part 50.

The controller 25 may adjust the predetermined menu by a selection of the menu adjusting button if the sub image is not displayed on the display part 50. If the display part 50 displays the main image, the sub image and the menu window, the processor 20 may adjust one of the display states of the sub image and the menu window according to a preset priority if it receives the selection signal of the menu adjusting button. If the position and size of the sub image is adjusted through the menu of the menu window, it is preferable in an exemplary embodiment to set the menu window as a priority, however, the invention is not limited thereto.

The controller 25 may adjust the display state of the sub image according to an adjusting direction of a direction key provided in the menu adjusting button if the sub image is displayed on the display part 50, i.e., if the PIP mode is in operation.

If a direction key, which directs the sub image positioned in a first side within the main image to a second side thereof, is selected, the controller 25 may control the PIP processor 21 to display the sub image on the second side of the main image.

The controller 25 may control the PIP processor 21 to change the display state of the sub image corresponding to the selection of the direction key as a changeable display state of the sub image is stored in the memory 27.

Figure 2:
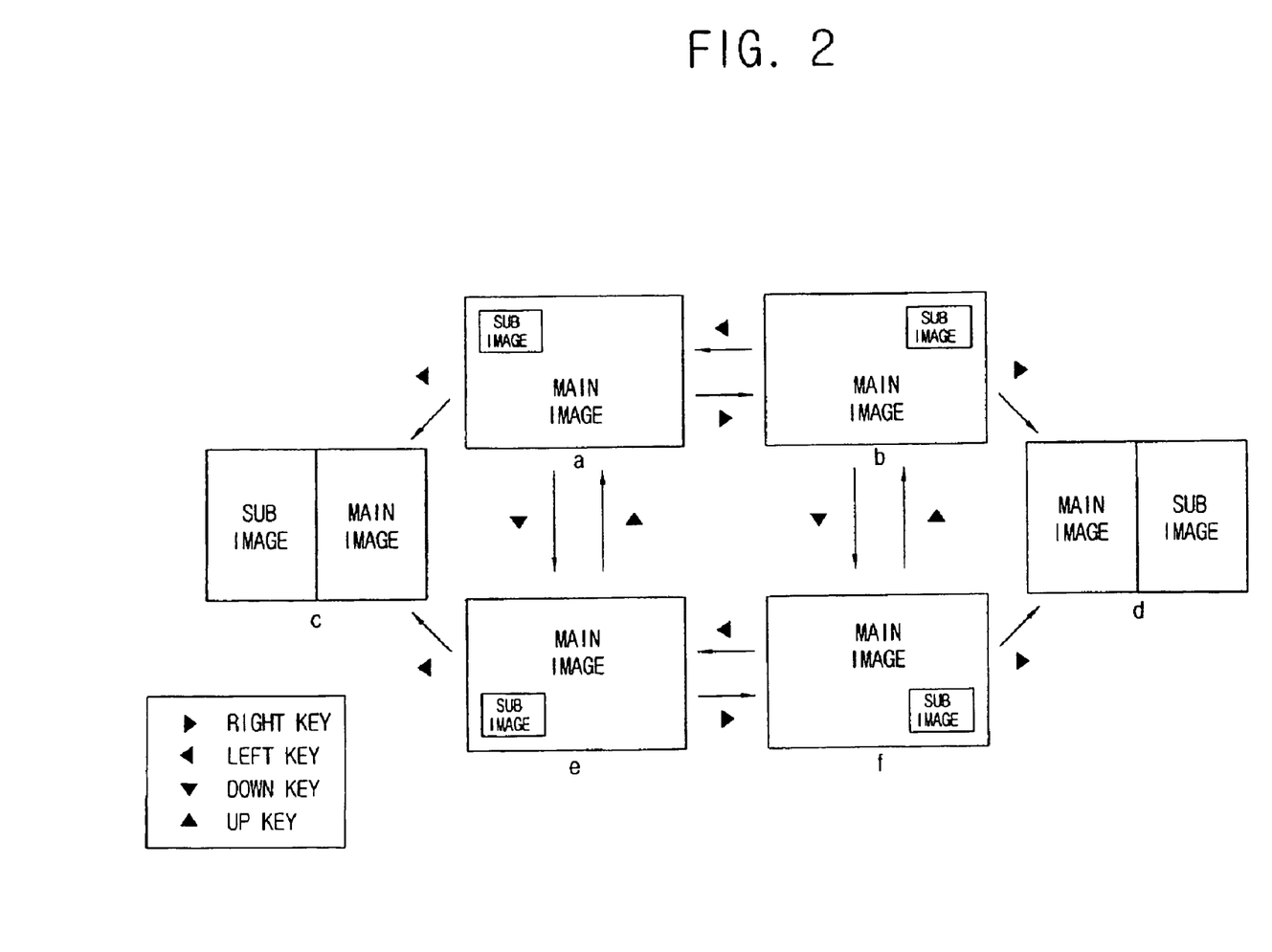
FIGS. 2 and 3 illustrate steps of adjusting a display state of a main image and a sub image according to an exemplary embodiment of the present invention.
Figure 3:
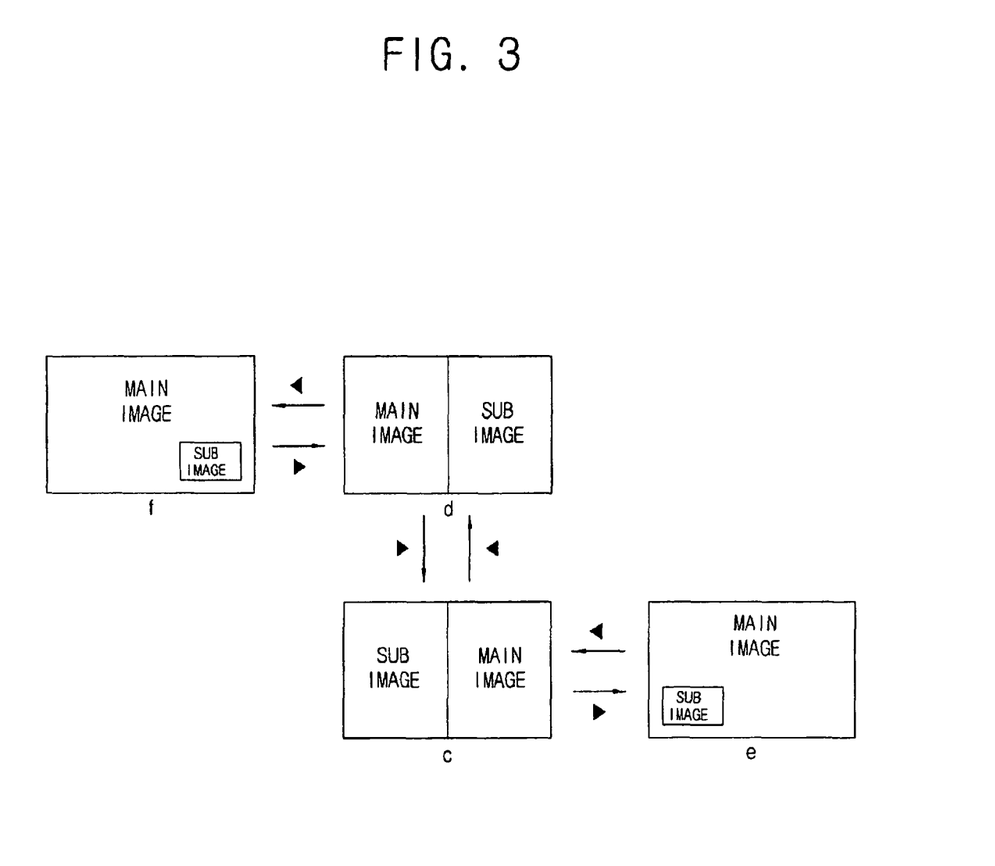

Referring to FIGS. 2 and 3, in the state that the sub image is displayed in a upper right side (refer to "b") of the main image, the processor 20 may change the sub image to be positioned in a lower right side (refer to "f") thereof if a down key is selected, and change the sub image to be positioned in a upper left side (refer to "a") thereof if a left key is selected.

With the same method, in the state that the sub image is displayed in a lower left side (refer to "e") of the main image, the processor 20 may change the sub image to be positioned in the upper left side (refer to "a") thereof if a up key is selected, and change the sub image to be positioned in the lower right side (refer to "f") thereof if a right key is selected.

In the state that the sub image is displayed in the upper left side (refer to "a") of the main image, the processor 20 may change the sub image to be positioned in the lower left side (refer to "e") thereof if the down key is selected, and change the sub image to be positioned in the upper right side (refer to "b") thereof if the right key is selected.

In the state that the sub image is displayed in the lower right side (refer to "f") of the main image, the processor 20 may change the sub image to be positioned in the upper right side (refer to "b") thereof if the up key is selected, and change the sub image to be positioned in the lower left side (refer to "e") thereof if the left key is selected.

Meanwhile, if the sub image is disposed in a lateral side of the main image, the controller 25 may control the PIP processor 21 to display the sub image in an external lateral side of the main image if the direction key corresponding to a lateral-side direction of the main image based on the sub image is selected.

In the state the sub image is positioned in an outside of the main image, the controller 25 may control the PIP processor 21 to dispose the sub image within the main image if the direction key corresponding to the direction to the main image on the basis of the sub image is selected.

For example, if the sub image is provided in the right side (refer to "b" and "f") of the main image, the processor 20 may adjust the sub image to be positioned in an external right side (refer to "d") of the main image in a case that the right key is selected.

If the sub image is disposed in the external right side (refer to "d") of the main image, the processor 20 may adjust the sub image to be positioned in the upper right side or in the lower right side (refer to "b" and "f") of the main image in a case that the left key is selected.

If the sub image is provided in the left side (refer to "a" and "e") of the main image, the processor 20 may change the sub image to be disposed in an external left side (refer to "c") of the main image in a case that the left key is selected. If the sub image is disposed in the external left side (refer to "c") of the main image, the processor 20 may adjust the sub image to be disposed in the upper left side or the lower left side (refer to "a" and "e") of the main image in a case that the right key is selected.

The controller 25 may control the PIP processor 21 to allow the sub image and the main image change positions with each other if the direction key which directs an opposition direction of the main image based on the sub image is selected, in the state that the sub image is displayed in the external lateral side (refer to "c" and "d" in FIGS. 2 and 3) of the main image.

Referring to FIG. 3, in the state that the sub image is provided in the left side (refer to "c") of the main image, the processor 20 controls the PIP processor 21 to dispose the sub image in the right side (refer to "d") thereof if the left key is selected. In the case that the sub image is provided in the right side (refer to "d") of the main image, the processor 20 controls the PIP processor 21 to dispose the sub image in the left side (refer to "c") thereof if the right key is selected.

Figure 4:
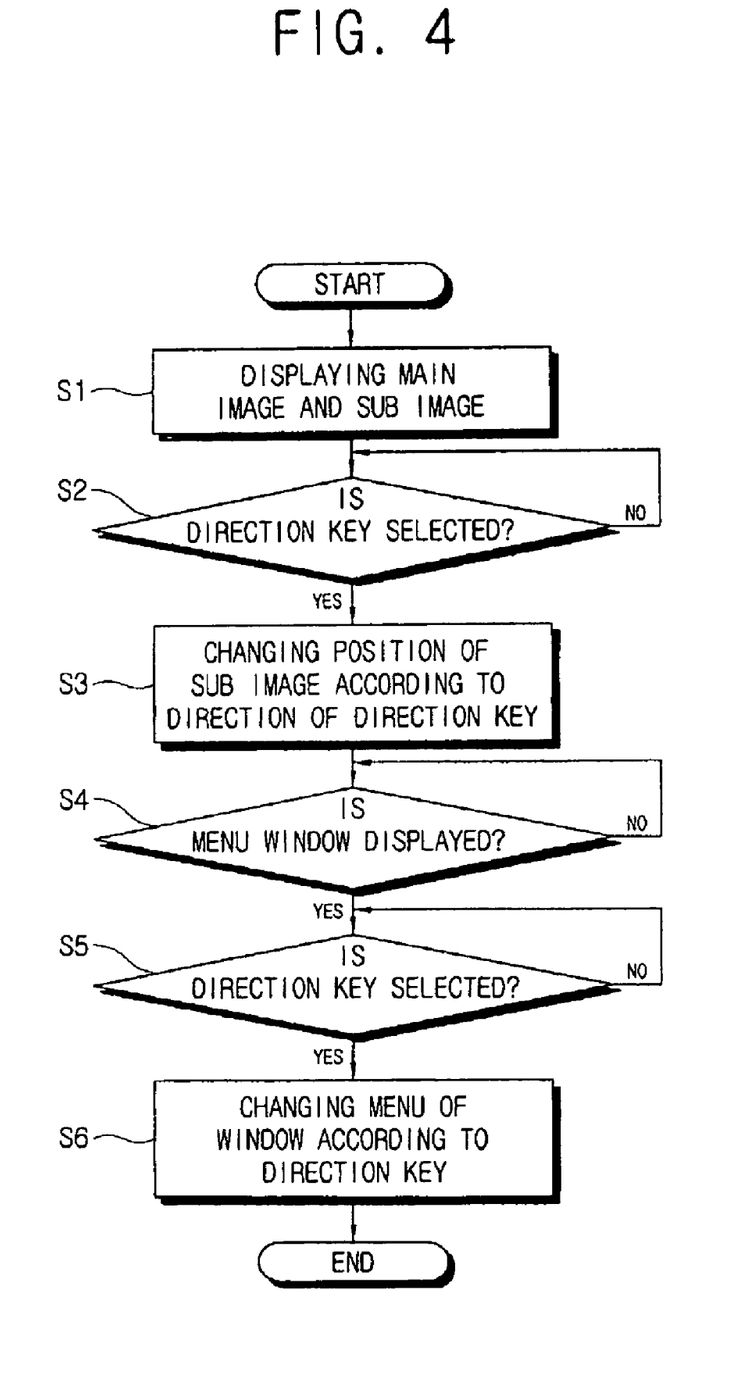
FIG. 4 is a control flowchart of the display apparatus according to an exemplary embodiment of the present invention.

As shown in FIG. 4, the display apparatus according to the present invention may adjust the display state of the sub image through the selection of the menu adjusting button if the main image and the sub image are displayed on the display part 50 at operation S1. As the menu adjusting button comprises the direction key, through the selection of the direction key at operation S2, the processor 20 adjusts the display state of the sub image corresponding to the selection of the direction key at operation S3.

Figure 5:
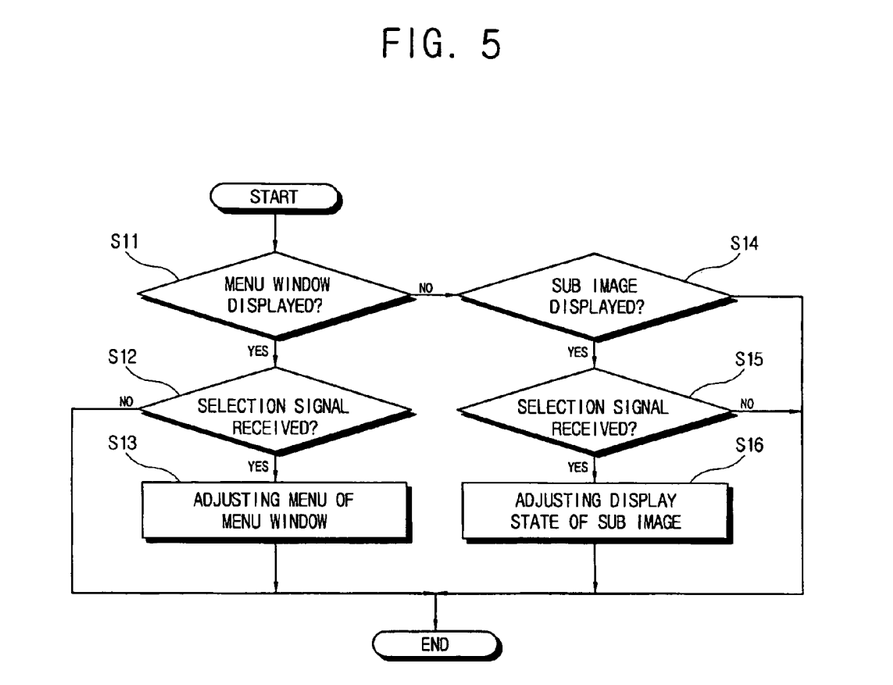
FIG. 5 is a control flowchart depicting a method of controlling a display apparatus according to an exemplary embodiment of the invention.

FIG. 5 shows a method of controlling a display apparatus having a display part to display a main image and a sub image thereon. A determination is made as to whether the display part displays a menu window having a predetermined menu thereon at operation S11. If the menu window is displayed, a determination is made as to whether a detection signal has been received at operation S12. If it is determined that the detection signal has been received, then a menu of the menu window is adjusted at operation S13. Should it be determined that the detection signal has not been received, then the process ends.

On the other hand, if the menu window is not displayed, then a determination is made as to whether the display part displays a sub image thereon at operation S14. If the sub image is displayed, a determination is made as to whether a detection signal has been received at operation S15. If it is determined that the detection signal has been received, then a display state (such as a size and/or position) of the sub image is adjusted at operation S16. Should it be determined that the detection signal has not been received, then the process ends.

As described above with reference to FIGS. 2 and 3, the position and the size of the sub image may be changed by the direction of the direction key. The description thereof will be avoided as it is the same as that described above.

Meanwhile, if the display part 50 only displays the main image, the menu of the predetermined menu window is adjusted by the selection of the menu adjusting button. At this time, the menu of the menu window comprises a menu of adjusting the display state of the sub image. The menu may be adjusted so that the display state of the sub image is adjusted.

In the state that the display part 50 displays the main image, the sub image and the menu window thereon at operation S4, the processor 20 adjusts one of the display state of the sub image and the menu of the menu window according to the priority set in the processor 20 if the direction key of the menu adjusting button is selected at operation S5. It is preferable that the menu of the menu window is adjusted at operation S6, but not limited thereto.

In the foregoing embodiment, the function of the menu adjusting button is changed according to whether the sub image is displayed on the display part 50 as the user selection part 40 comprises the menu adjusting button. However, if the sub image displayed in the internal lateral side (refer to "a", "b", "e" and "f" in FIG. 2 or 3) of the main image is displayed in the external lateral side (refer to "c" and "d" in FIG. 2 or 3) of the main image by the selection of the user input part, and vice versa, an additional key may be provided in the user input part to perform the function of changing the position of the sub image.

In the foregoing exemplary embodiment, the sub image is positioned in the upper left side and the lower left side of the main image, but not limited thereto. The sub image may be variously positioned.

As described above with reference to FIGS. 2 and 3, in the display apparatus according to the present invention, the display state of the sub image is adjusted according to the direction adjustment of the predetermined direction key. The above-described direction according to the direction key is provided as an exemplary embodiment. The direction thereof is not limited to that described in the foregoing embodiment.

As described above, if the display apparatus according to the present invention displays the sub image in the outside of the main image, the size of the sub image may be smaller than that of the main image, or the sub image may be displayed on a part of the external lateral side of the main image. However, the size and the position of the sub image is not limited thereto.

In the related art display apparatus, only the states of "a", "b", "c" and "d" in FIG. 2 are changed from the menu of adjusting the position of the sub image if the display state of the sub image is changed. Thus, if the display state of the sub image is changed to the states "c" and "d", it is required to enter the menu for adjusting the size of the sub image.

However, in the display apparatus according to the present invention, the display state of the sub image is changed by the selection of the button provided in the user selection part 40, without difficulty.

Also, the display apparatus according to an exemplary embodiment of the present invention does not need to provide an additional button to adjust the display state of the sub image as the existing menu adjusting button changes its function.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising a display part which displays a main image and a sub image thereon, further comprising: a user selection part having a menu adjusting button; and a processor to adjust a display state of the sub image by a selection of the menu adjusting button if the display part displays the main image and the sub image thereon, and to adjust a predetermined menu by the selection of the menu adjusting button if the display part does not display the sub image thereon.

2. The display apparatus according to claim 1, further comprising an interface generator to generate a menu window having a predetermined menu, wherein the processor adjusts one of the display state of the sub image and the menu according to a preset priority if the menu adjusting button is selected in a case that the main image, the sub image, and the menu window are displayed on the display part.

3. The display apparatus according to claim 2, wherein the menu adjusting button comprises a direction key to adjust the menu, and the processor adjusts the menu if the menu adjusting button is selected in a case that the main image, the sub image, and the menu window are displayed on the display part, and adjusts the display state of the sub image according to an adjustment direction of the direction key only if the main image and the sub image are displayed on the display part.

4. The display apparatus according to claim 3, wherein the processor adjusts the sub image to be displayed in a second side of the main image if the direction key which directs the sub image to the second side of the main image based on the sub image is selected in a case that the sub image is displayed in a first side of the main image.

5. The display apparatus according to claim 4, wherein the processor adjusts the sub image to be displayed in an external lateral side of the main image if the direction key which directs the sub image to a lateral side of the main image based on the sub image is selected in a case that the sub image is displayed in the lateral side within the main image.

6. The display apparatus according to claim 5, wherein the processor adjusts the sub image to be displayed in the lateral side within the main image if the direction key which directs the sub image to the main image based on the sub image is selected in a case that the sub image is displayed in the external lateral side of the main image.

7. The display apparatus according to claim 5, wherein the processor allows the sub image and the main image to change positions with each other if the direction key which directs an opposite direction of the main image based on the sub image is selected in a case that the sub image is displayed in the external lateral side of the main image.

8. The display apparatus according to claim 1, wherein the menu adjusting button comprises a direction button and wherein the display state of the sub image is adjusted to a different position within the main image and to be displayed separate and adjacent to the main image by manipulating the direction button.

9. The display apparatus according to claim 1, wherein the menu adjusting button is a tangible direction key that converts the sub-image from being displayed within the main image to being displayed adjacent to the main image and vice versa based on manipulation of the tangible direction key.

10. A display apparatus comprising a display part to display a main image and a sub image thereon, further comprising: a user selection part; and a processor to adjust the sub image to be displayed in an internal lateral side or an external lateral side of the main image by a selection of the user selection part in a case that the sub image is displayed in either the internal lateral side or the external lateral side of the main image.

11. The display apparatus according to claim 10, wherein the user selection part comprises a direction key and the processor adjusts a display state of the sub image according to an adjustment direction of the direction key.

12. The display apparatus according to claim 11, wherein the processor adjusts the sub image to be displayed in the internal lateral side of the main image if the direction key which directs the sub image to the main image based on the sub image is selected in a case that the sub image is displayed in the external lateral side of the main image.

13. The display apparatus according to claim 12, wherein the processor allows the sub image and the main image to change positions with each other if the direction key which directs an opposite direction of the main image based on the sub image is selected in a case that the sub image is displayed in the external lateral side of the main image.

14. The display apparatus according to claim 11, wherein the processor adjusts the sub image to be displayed in a second side of the main image if the direction key which directs the sub image to the second side of the main image based on the sub image is selected in a case that the sub image is displayed in a first side of the main image.

15. The display apparatus according to claim 14, wherein the processor adjusts the sub image to be displayed in the external lateral side of the main image if the direction key which directs the sub image to a lateral side of the main image based on the sub image is selected in a case that the sub image is displayed in the internal lateral side of the main image.

16. A method of controlling a display apparatus having a display part to display a main image and a sub image thereon, comprising: receiving a selection signal for adjusting a predetermined menu; adjusting a display state of the sub image by the selection signal if the display part displays the main image and the sub image thereon; and adjusting the predetermined menu by the selection signal if the display part does not display the image thereon.

17. The method according to claim 16, wherein the selection signal is received from a remote controller.

18. The method according to claim 16, wherein the selection signal is generated from a button provided in the display apparatus.

19. A method of controlling a display apparatus having a display part to display a main image and a sub image thereon, comprising: receiving a selection signal from a predetermined menu adjusting button; adjusting a display state of the sub image by the selection signal if the display part displays the main image and the sub image thereon; and adjusting a predetermined menu by the selection signal if the display part does not display the sub image thereon.

20. The method according to claim 19, further comprising displaying the main image, the sub image and a predetermined menu window on the display part, and adjusting one of the display state of the sub image and the menu according to a predetermined priority if the selection signal is supplied.

21. The method according to claim 20, wherein the adjusting one of the display state of the sub image and the menu according to the priority comprises adjusting the menu according to the selection signal as the priority is set as the menu.

22. The method according to claim 21, wherein the adjusting the display state of the sub image comprises receiving the selection signal to direct the sub image to a second side of the main image based on the sub image if the sub image is displayed in a first side of the main image, and adjusting the sub image to be displayed in the second side of the main image.

23. The method according to claim 21, wherein the adjusting the display state of the sub image comprises receiving the selection signal to direct the sub image to a lateral side of the main image based on the sub image if the sub image is displayed in the lateral side within the main image, and adjusting the sub image to be displayed in the external lateral side of the main image.

24. The method according to claim 23, wherein the adjusting the display state of the sub image comprises receiving the selection signal to direct the sub image to the main image based on the sub image if the sub image is displayed in the external lateral side of the main image, and adjusting the sub image to be displayed in the lateral side within the main image.

25. The method according to claim 23, wherein the adjusting the display state of the sub image comprises receiving the selection signal to direct the sub image to an opposite direction of the main image based on the sub image if the sub image is displayed in the external lateral side of the main image, and allowing the main image and the sub image to change positions with each other.

26. A method of controlling a display apparatus having a display part to display a main image and a sub image thereon, comprising: displaying the sub image in one of an internal lateral side or an external lateral side of the main image, and displaying the sub image in either the internal lateral side or the external lateral side of the main image by a predetermined selection signal.

27. The method according to claim 26, further comprising receiving the selection signal to direct the sub image to the main image based on the sub image if the sub image is displayed in the external lateral side of the main image, and displaying the sub image in the internal lateral side of the main image.

28. The method according to claim 27, further comprising receiving the selection signal to direct the sub image to an opposite direction of the main image based on the sub image if the sub image is displayed in the external lateral side of the main image, and allowing the sub image and the main image to change positions with each other.

29. A method of controlling a display apparatus having a display part to display a main image and a sub image thereon, comprising: detecting whether the display part displays a menu window having a predetermined menu thereon; detecting whether the display part displays the sub image thereon if the display part dose not display the menu window thereon; adjusting a display state of the sub image by a selection signal if the display part displays the sub image thereon.

30. The method according to claim 29, wherein the adjusting the display state of the sub image by the selection signal comprises detecting whether the selection signal is received.

31. The method according to claim 29, wherein the adjusting the display state of the sub image by the selection signal comprises adjusting at least one of a size and a position of the sub image.

32. The method according to claim 29, further comprising detecting whether the selection signal is received if the display part displays the menu window thereon; adjusting the predetermined menu by the selection signal.

* * * * *